United States Patent Office 3,840,617
Patented Oct. 8, 1974

---

3,840,617
UNSATURATED POLYESTER RESIN
Kurt Demmler, Milan Velic, and Karl Zoller, Ludwigshafen, Germany, assignors to Badische Anilin- & Soda-Fabrik Aktiengesellschaft, Ludwigshafen (Rhine), Germany
No Drawing. Filed May 24, 1972, Ser. No. 256,349
Int. Cl. C08f 43/02, 45/60
U.S. Cl. 260—863
14 Claims

ABSTRACT OF THE DISCLOSURE

An unsaturated polyester resin which contains a salt of an N-substituted N-nitrosohydroxylamine of the formula

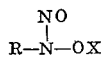

wherein R denotes an aliphatic, cycloaliphatic or araliphatic radical of up to 18 carbon atoms, preferably cyclohexyl, and X denotes a metal, an ammonium radical or an organic ammonium radical, and which optionally contains further additives.

---

The present invention relates to unsaturated polyester resins containing a salt of an N-substituted N-nitrosohydroxylamine.

It is known that unsaturated polyester resins, i.e. mixtures of an unsaturated polyester and a copolymerizable olefinically unsaturated monomeric compound, contain small amounts of inhibitors. The purpose of this addition of inhibitor is to enable the unsaturated polyester to be mixed with the copolymerizable olefinically unsaturated monomeric compound, which is usually styrene, at elevated temperatures, to impart adequate stability to the resulting polyester resin and to provide an adequate pot life after the addition of curing agent and accelerator.

The inhibitors used for unsaturated polyester resins are usually polyphenols such as hydroquinone, t-butyl pyrocatechol and toluhydroquinone, and the corresponding quinones and monophenols such as di-t-butyl-p-cresol. Additions of these compounds enable the unsaturated polyester to be mixed with monomeric styrene at elevated temperature and provide adequate stability of these mixtures but at the same time they decelerate curing with the result that with increasing amounts of these inhibitors both the gelling time, which is equivalent to the pot life, is lengthened and the subsequent curing reaction is slowed down. Another drawback of these inhibitors is that they lead to undesirable discoloration in the unsaturated polyester resins and their cured products either on account of their own color (e.g. in the case of quinones) or (as in the case of the polyphenols for example) because they form colored complexes with the cobalt salts normally included as accelerators.

It is an object of the present invention to provide unsaturated polyester resins possessing adequate stability, showing no deceleration during curing and providing virtually colorless cured products.

This and other objects and advantages of the invention are achieved by an unsaturated polyester resin containing a mixture of (a) at least one conventional unsaturated polyester
(b) at least one polymerizable olefinically unsaturated monomeric compound,
(c) at least one polymerization inhibitor and, optionally,
(d) other conventional additives, characterized in that said unsaturated polyester resin contains a salt of an N-substituted N-nitrosohydroxylamine of the formula:

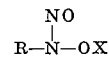

in which R denotes an aliphatic, cycloaliphatic or araliphatic radical of up to 18 carbon atoms and X is a metal, an ammonium radical or an organic ammonium radical.

The use of salts of N-substituted N-nitrosohydroxylamine, in particular of N-nitroso-N-cyclohexylhydroxylamine, in unsaturated polyester resins produces polyester resins which not only show good stability but also, surprisingly, cure at a faster rate and provide virtually colorless cured products.

U.K. Pat. 846,239 discloses the use of N-substituted N-nitrosohydroxylamines and their salts of the formula:

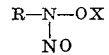

in which R denotes an aliphatic, cycloaliphatic or araliphatic radical of up to 18 carbon atoms and X denotes hydrogen, a metal or an ammonium radical, for the stabilization of ethylenically unsaturated polymerizable monomeric compounds such as acrylic acid, acrylamide or methacrylamide, against polymerization.

However, it could not have been foreseen that these compounds, particularly the salts of N-nitroso-N-cyclohexylhydroxylamine, when used in unsaturated polyester resins, not only impart stability to said resins but also accelerate their curing rate and provide virtually colorless cured products.

The following remarks on the components of the polyester resins of the invention are pertinent.

Suitable unsaturated polyesters (a) are the usual polycondensation products of polybasic, in particular dibasic, carboxylic acids coupled in ester-like manner to polyhydric and in particular dihydric alcohols and optionally containing additional radicals of monobasic carboxylic acids and/or radicals of monohydric alcohols and/or radicals of hydroxycarboxylic acids, of which radicals at least some must contain ethylenically unsaturated copolymerizable groups. Such unsaturated polyesters are usually prepared from their components either by melt condensation or by condensation under azeotropic conditions.

It has been found generally convenient for the unsaturated polyesters to have an acid number of from 5 to 70 and preferably from 25 to 50 and an average molecular weight of approximately 800–4,000.

Suitable polyhydric and in particular dihydric, optionally unsaturated alcohols are the usual alkanediols containing acyclic and/or cyclic groups, such as ethylene glycol, propylene glycol-1,2, butylene glycol-1,3, butanediol-1,4, hexanediol-1,6, 2,2-dimethylpropanediol-1,2, diethylene glycol, triethylene glycol, cyclohexanediol-1,2, 2,2-bis(p-hydroxycyclohexyl)propane, neopentyl glycol, 1,4-bis-methylolcyclohexane and 1,4-butenediol. Monohydric alcohols such as benzyl alcohols may also be included in minor quantities. The polyhydric and in particular dihydric alcohols are generally used in stoichiometric or approximately stoichiometric amounts for reaction with polybasic and in particular dibasic carboxylic acids or condensable derivatives thereof.

Suitable carboxylic acids or derivatives thereof are dibasic olefinically unsaturated carboxylic acids such as maleic acid, fumaric acid, itaconic acid, citraconic acid and mesaconic acid acid or their anhydrides. Other dibasic unsaturated and/or saturated carboxylic acids may also be incorporated in the polyesters, for example succinic acid, glutaric acid, α-methylglutaric acid, adipic acid, sebacic acid, phthalic acid, phthalic anhydride, isophthalic acid, terephthalic acid, dihydrophthalic acid, 1,2,3,6-tetrahydrophthalic acid, 3,6-endomethylene - 1,2,3,6 - tetrahydrophthalic acid and their chloro substitution products such as 2,3,4,5,7,7-hexachloro-2,5-endomethylene-1,2,5,6-tetrahydrophthalic acid, as may also be mono-, tri- and higher polybasic carboxylic acids such as propionic acid, 1,2,4-benzene-tricarboxylic acid or 1,2,4,5 - benzene-tetracarboxylic acid.

Unsaturated polyesters of this kind are preferably composed of from about 0.8 to 2.4 moles of maleic acid and from 0.8 to 2.4 moles of phthalic acid and from about 1.6 to 4.8 moles of 1,2-propylene glycol or of approximately equimolar amounts of 2,3,4,5,7,7-hexachloro-2,5-endomethylene-1,2,5,6-tetrahydrophthalic acid and butanediol-1,3.

Suitable polymerizable olefinically unsaturated monomeric compounds (b) are all usual monomeric compounds which are copolymerizable with unsaturated polyesters, in particular acrylic, methacrylic and vinyl compounds, e.g. esters of acrylic acid or methacrylic acid with alcohols of from 1 to 8 carbon atoms, such as ethyl acrylate, butyl acrylate, methyl methacrylate and glycol dimethacrylate. amides, N-methylolamides and etherified N-methylolamides or nitriles of α,β-unsaturated monocarboxylic acids, e.g. acrylamide, methacrylamide, N-methylolacrylamide, N-butoxymethylmethacrylamide, acrylonitrile and methacrylonitrile, vinyl esters of mono- and poly-carboxylic acids, e.g. vinyl acetate, vinyl propionate and divinyl succinate, N-vinyl compounds, e.g. N-vinyl pyrrolidone, vinyl ethers of mono- and poly-oxy compounds, e.g. isobutylvinyl ether, and butanediol-1,4-divinyl ether. Other suitable compounds are allyl compounds such as allyl esters of saturated mono- or unsaturated mono- or poly-carboxylic acids or inorganic acids, e.g. diallyl phthalate, diallyl maleate, triallyl cyanurate and triallyl phosphate, and allyl ethers of mono- or poly-oxy compounds such as glycol diallyl ether, pentaerythritol tetraallyl ether, tetramethylolacetylene-diurea diallyl ether and its condensation products which are soluble in the unsaturated polyesters. Preferred compounds are vinyl aromatics such as styrene, alkyl-substituted and/or halo-substituted styrenes, vinyl toluene, divinyl benzene, or vinyl naphthalene and α-methylstyrene. Mixtures of said monomers are also suitable.

The composition of the mixture of unsaturated polyester and at least one polymerizable olefinically unsaturated monomeric compound may be varied within wide limits. In general, the mixtures contain from 20 to 70% and preferably from 30 to 60% by weight of olefinically unsaturated monomeric compound and from 80 to 30 and preferably from 70 to 40% by weight of unsaturated polyester. These mixtures may also contain further unsaturated polymers such as polybutadiene homo- and/or co-polymers in minor quantities.

The polymerization inhibitors (c) used according to the invention are salts of N-substituted N-nitrosohydroxylamines of the formula:

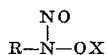

in which R denotes an aliphatic, cycloaliphatic or araliphatic radical of up to 18 carbon atoms and X denotes a metal, an ammonium radical or an organic ammonium radical. The preparation of these compounds is described for example in U.K. Pat. 815,537. Suitable aliphatic, cycloaliphatic and araliphatic radicals R are for example methyl, isopropyl, butyl, benzyl, cyclooctyl, cycloheptyl and, in particular, cyclohexyl.

The radical X may be the ammonium radical or an organic ammonium radical or any metal, e.g. potassium, magnesium, calcium, strontium, aluminum, lead, silver, copper, zinc, mercury, cerium, iron, nickel and cobalt. Preferred compounds are the cobalt, zinc and, in particular, aluminum salts of N-nitroso-N-cyclohexyl-hydroxylamine.

The salts of N-substituted N-nitrosohydroxylamines are contained in the unsaturated polyester resins generally in an amount of from 0.001 to 1% and preferably from 0.01 to 0.05% by weight, based on the sum of the weights of components (a) and (b).

The unsaturated polyester resins of the invention may also contain conventional polymerization inhibitors such as hydroquinone. Using such a combination of inhibitors, it is not possible to obtain completely colorless products but it is possible to control the curing rate as desired.

The addition of the salt of N-substituted N-nitrosohydroxylamines is conveniently carried out by mixing them with the polyester at elevated temperature, i.e. at temperatures of more than 100° C., before blending the polyester with the polymerizable olefinically unsaturated monomeric compound (e.g. styrene). The unsaturated polyester resin of the invention may, however, be prepared by mixing the individual components or mixtures thereof in any order. Mixing of the components is carried out in conventional equipment, e.g. stirred vessels, at temperatures ranging from 10° to 150° C. and preferably from 80° to 120° C.

Suitable other conventional additives (d) which may be included in the unsaturated polyester resins of the invention are shade lighteners such as phosphorous acid, lactic acid, malic acid and salts thereof, generally in amounts of less than 1% by weight based on the sum of the weights of components (a) and (b); accelerators such as heavy metal salts, e.g. solvent-soluble cobalt salts, amines, mercaptans, and 1,3-diketo compounds such as ethyl acetoacetate, generally in amounts of up to 2% by weight based on the combined weights of components (a) and (b); pigments such as titanium dioxide, iron oxide red, chromium green, and organic pigments; fillers such as kaolin, chalk and dolomite in relatively finely divided form; viscosity controlling additives such as magnesium oxide, highly dispersed silicic acid and asbestos fibers; and reinforcing materials such as glass fibers in the usual forms, textile fibers, carbon fibers, boron fibers and metal fibers and whiskers and the additives normally employed in the manufacture of low-shrink polyester resins.

The unsaturated polyester resins stabilized with salts of N-substituted N-nitrosohydroxylamines, in particular the aluminum, zinc and cobalt salts of N-nitroso N-cyclohexylhydroxylamine, are considerably less colored than the same polyester resins when stabilized with conventional inhibitors and provide cured products of much lighter shade. Colorless water-white cured products are obtained when small amounts of the above-mentioned shade lighteners, e.g. phosphorous acid, are added.

The unsaturated polyester resins of the invention are suitable for use in all conventional applications of unsaturated polyester resins. For example, they may be used as coating compositions, as casting resins and in the preparation of optionally reinforced molding materials such as trowelling mixes, putties, bulk molding compounds, sheet molding compounds, preimpregnated glass fiber mats and pre-pregs.

Curing of the polyester resins of the invention may be effected by any of the methods usually employed for unsaturated polyester resins. Thus curing may be carried out either at room temperature with the admixture of a ketone peroxide or hydroperoxide such as cyclohexanone peroxide, methylethyl ketone peroxide or cumene hydroperoxide, as initiator and a heavy metal salt, in particular a cobalt salt of a carboxylic acid, e.g. cobalt octoate or cobalt naphthenate, or with the admixture of a deacyl peroxide, e.g. benzoyl peroxide, together with an aromatic tertiary amine such as dimethyl aniline or diethyl p-toluidine, or also at elevated temperatures of from about 50° to 160° C. using any desired organic peroxide.

The unsaturated polyester resins of the invention may also be cured by ionizing radiation, e.g. electronic beam, X-rays, γ-rays or radio-active mixed radiation.

In the following examples, the parts and percentages are by weight.

EXAMPLE 1

431 parts of maleic anhydride, 325 parts of phthalic anhydride and 525 parts of propylene glycol-1,2 are esterified with stirring at 200° C. under a stream of nitrogen until the acid number of the reaction product has fallen to about 50. After cooling to about 120° C., the inhibitors hydroquinone, the aluminum salt of N-nitroso-N-cyclohexylhydroxylamine or the corresponding potassium or calcium salt are added and the polyester/stabilizer mixture is dissolved in styrene to form a 65% solution. 50% phosphorous acid is added in the quantities stated in Table II below. Table I indicates the stability of the mixtures at 60° and 80° C., whilst Table II gives the results of curing at 25° C. using the system cyclohexanone peroxide/cobalt naphthenate and benzoyl peroxide/dimethyl aniline. In addition, films having a thickness of 100 μ are cured in conventional manner and the drying time is determined with sanding apparatus as normally used in the paint industry (Table II). In some cases the color of castings as obtained on curing at room temperature is also stated.

TABLE I

| Additive, percent: | | | | | | |
|---|---|---|---|---|---|---|
| Hydroquinone | 0.01 | | | 0.0033 | | 0.01 |
| Aluminum salt of N-nitroso-N-cyclohexylhydroxylamine | | 0.01 | 0.05 | | 0.0066 | 0.01 |
| Calcium salt of N-nitroso-N-cyclohexylhydroxylamine | | | | | 0.01 | |
| Stability at— | | | | | | |
| 60° C. (hrs.) | 190 | 200 | 317 | 330 | 400 | 320 |
| 80° C. (hrs.) | 42 | 110 | 166 | 40 | 120 | 70 |

If stabilization is carried out with hydroquinone alone, an increase in the hydroquinone content from 0.01% to 0.05% improves the stability but also slows down the curing reaction to a considerable extent. When phosphorous acid is added to the hydroquinone-stabilized polyester resin, curing is decelerated to such an extent, particularly when small amounts of cobalt are present, that several hours are required before curing is complete. At the best, pale yellow cured products are obtained. By using the aluminum salt of N-nitroso-N-cyclohexylhydroxylamine in amounts ranging from 0.01 to 0.05%, not only is the stability improved considerably with increasing amounts of the inhibitor but also there is hardly any or no impairment of the curing rate either at room temperature or at elevated temperatures. Curing proceeds much faster than when stabilization is effected with hydroquinone alone. When phosphorous acid is added, there is only insignificant deceleration, and the addition of 2% of cobalt accelerator (10% styrene solution of cobalt naphthenate containing 1% of cobalt), as generally recommended for the curing of surface coatings, there is no detectable deceleration. Drying times of the films are shorter and the cured products are completely colorless. Replacement of the aluminum salt of N-nitroso-N-cyclohexyl-hydroxylamine by the potassium or calcium salt produces only insignificantly different results. These findings hold both for the resin as described in Example 1 and the slower reacting resin as described in the following Example 2.

TABLE II

| Additive (percent): | | | | | | | | | | | | | | | | | | |
|---|---|---|---|---|---|---|---|---|---|---|---|---|---|---|---|---|---|---|
| (a) Hydroquinone | 0.01 | | | | | | 0.01 | 0.01 | | | | | | | | | | 0.0033 |
| (b) Al salt of NCHA[1] | | 0.01 | 0.01 | 0.01 | 0.01 | 0.05 | 0.05 | | | | | | | | | | | 0.0066 |
| (c) K salt of NCHA | | | | | | | | 0.02 | 0.02 | | | | | | | | | |
| (d) Ca salt of NCHA | | | | | | | | | | 0.015 | 0.020 | 0.040 | 0.020 | | 0.01 | 0.01 | | |
| Phosphorous acid (50%) | | | | 0.02 | 0.02 | | | | | | | | | 0.01 | 0.02 | | | |
| Initiator system: | | | | | | | | | | | | | | | | | | |
| A[2] (25° C.) | 4/0.4 | 2/2 | 3/0.1 | 2/2 | 4/0.4 | 4/0.4 | | 4/0.4 | | | | | | | | | 4/0.4 | |
| B[3] (25° C.) | | | | | | | 4/0.4 | | 4/0.4 | 2/2 | 2/2 | 2/2 | 4/0.4 | | | | | |
| Gelling time: | | | | | | | | | | | | | | | | | | |
| At — | 9' | 5'30" | 3/0.1 10' | 6'10" | | 3/0.2 18'0" | 3/0.2 19'0" | 3/0.2 1'42" | 3/0.2 2'23" | 3' 6'30" | 3' 6'30" | 3' 7' | 3' 7' | 3'00 | 4'30" 6'33" | 4'30" 11' | 3' 4' 73.3" | 5' 6' |
| At — | 9' | 6'30" | 4'30" | 7'0" | | 11'34" | 1'50" | 4'10" | 10'12" | | | | | | | | | 8' 145 |
| Max. temp. (° C.) | 140 | 145 | 156 | 143 | | 148 | 35 | 112 | 103 | 145 | 145 | 140 | 145 | 158 | 140 | 132 | 150 | 140 |
| Color of casting (25 mm. φ, cured with initiator system A 1/01) | Yellow | | | (5) | (6) | | | | | (6) Colorless | | | | | (6) Colorless | | (6) Colorless | (6) Colorless |
| Drying time of film using initiator system A (min.)[4][5] | | 20 | | | | | | | | | 13 | 13 | 13 | | | 14 | | 15 |

[1] NCHA=N-nitroso-N-cyclohexylhydroxylamine.
[2] Initiator system A: percent of "Cyclonox" E 50/percent of cobalt accelerator (containing 1% of Co) ("Cyclonox" E 50 is a 50% solution of cyclohexanone peroxid in a plasticizer—sold by Oxydo GmbH, Emmerich/Rhine—"Cyclonox" is a registered trademark).
[3] Initiator system B: percent of BP paste/percent of dimethyl aniline (BP paste is a 50% slurry of benzoyl peroxide in dibutyl phthalate).
[4] Curing takes several hours.
[5] 0.1% in paraffin (softening range 50° to 52° C.). Thickness of film: 100/μ wet. Tested with sanding apparatus.
[6] Pale yellow.
[7] Weak yellow.

EXAMPLE 2

232 parts of maleic anhydride, 592 parts of phthalic anhydride and 480 parts of propylene glycol-1,2 are esterified in the manner described in Example 1 until the acid number has reached about 50. After cooling to 120° C., the inhibitors (a) hydroquinone and
(b) the aluminum salt of N-nitroso-N-cyclohexylhydroxylamine are added and the polyester is dissolved in styrene to give a 65% solution. Phosphorous acid is then added in the manner described in Example 1.

TABLE III
(Polyester resin of Example 2)

| Additive (percent): | | |
|---|---|---|
| (a) Hydroquinone | 0.01 | |
| (b) Aluminum salt of N-nitroso-N-cyclohexylhydroxylamine | | 0.01 |
| Stability at 80° C. (hrs.) | 68 | 100 |

TABLE IV
(Polyester resin of Example 2)

| Additive (percent): | | | | | | | | |
|---|---|---|---|---|---|---|---|---|
| (a) Hydroquinone | 0.01 | 0.01 | 0.01 | 0.01 | | | | |
| (b) Al salt of NCHA [1] | | | | | 0.01 | 0.01 | 0.01 | 0.01 |
| Phosphorous acid (50%) | | | 0.01 | 0.01 | | | 0.01 | 0.01 |
| Initiator system A (25° C.) [2] | 4/0.4 | 2/2 | 2/2 | 4/0.4 | 4/0.4 | 2/2 | 4/0.4 | 2/2 |
| Gelling time | 10'30" | 8'30" | 9'30" | (³) | 5'30" | 4' | 7' | 6' |
| Δt | 17'30" | 12' | 17'30" | | 16' | 11' | 19' | 11'30" |
| Max. temp. (° C.) | 80 | 56 | 65 | | 80 | 57 | 52 | 52 |
| Color of casting (25 mm. O, cured with initiator system A 1/01) | Yellow | | (⁴) | | (⁴) | (⁴) | Colorless | Colorless |
| Drying time of film using initiator system A (min.) [5] | | 27 | | | | | 20 | |

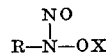

[1] NCHA=N-nitroso-N-cyclohexylhydroxylamine.
[2] Initiator system A: percent of "Cyclonox" E 50/percent of cobalt accelerator (containing 1% of Co) ("Cyclonox" E 50 is a 50% solution of cyclohexanone peroxide in a plasticizer—sold by Oxydo GmbH, Emmerich/Rhine—"Cyclonox" is a registered trade mark).
[3] Curing takes several hours.
[4] Pale yellow.
[5] 0.1% in paraffin (softening range 50° to 52° C). Thickness of film: 100μ wet. Tested with sanding apparatus.

EXAMPLE 3

The unsaturated polyester prepared as in Example 1 (acid number 50) is mixed, in separate samples, with (a) hydroquinone and
(b) the cobalt salt of N-nitroso-N-cyclohexylhydroxylamine and the mixtures are then dissolved in styrene to form 65% solutions (containing 0.01 and 0.02% respectively of inhibitor).

The stability of the mixture at 80° C. is 40 hours in the case of mixture (a) and 75 hours in the case of mixture (b).

The samples (a) and (b) are cured with the initiator system A (cf. Example 1) of 4/0.4 and 4/0 respectively, at 25° C.:

| | Sample (a) | Sample (b) |
|---|---|---|
| Gelling time | 9' | 4' |
| Δt | 18' | 15'30" |
| Max. temp. (° C.) | 140 | 140 |

We claim:

1. A curable unsaturated polyester resin comprising a mixture of
   (a) at least one unsaturated polyester consisting essentially of a polycondensation product of an olefinically unsaturated polybasic carboxylic acid and a polyhydric alcohol,
   (b) at least one polymerizable olefinically unsaturated monomeric compound, and
   (c) at least one polymerization inhibitor which is a salt of an N-substituted N-nitrosohydroxylamine of the formula:

$$\text{R}-\overset{\overset{\text{NO}}{|}}{\text{N}}-\text{OX}$$

in which R denotes an aliphatic, cycloaliphatic or araliphatic radical of up to 18 carbon atoms and X denotes a metal, an ammonium radical or an organic ammonium radical.

2. An unsaturated polyester resin as claimed in claim 1, wherein the radical R in said salt of the N-substituted N-nitrosohydroxylamine of the formula $$\text{R}-\overset{\overset{\text{NO}}{|}}{\text{N}}-\text{OX}$$

is cyclohexyl.

3. An unsaturated polyester resin as claimed in claim 1, wherein the salt of the N-substituted N-nitrosohydroxylamine is included in a quantity of from 0.001 to 1% by weight based on the combined weights of components (a) and (b).

4. An unsaturated polyester resin as claimed in Claim 1, wherein the inhibitor (c) is the aluminum, zinc or cobalt salt of N-nitroso-N-cyclohexylhydroxylamine.

5. An unsaturated polyester resin as claimed in Claim 1 containing at least one further additive for such polyester resins including polymerization inhibitors, lighteners, accelerators, pigments, fillers, viscosity controllers, reinforcers and antishrink additives.

6. An unsaturated polyester resin as claimed in Claim 1, wherein (a) is a polyester of an unsaturated dicarboxylic acid and a dihydric alcohol.

7. An unsaturated polyester resin as claimed in claim 1, wherein the polymerizable olefinically unsaturated monomeric compound (b) is a vinyl aromatic compound.

8. Surface coatings, casting resins and molding compositions containing an unsaturated polyester resin as claimed in claim 1.

9. An unsaturated polyester resin as claimed in Claim 1 wherein said mixture contains from 80 to 30% by weight of (a) and 20 to 70% by weight of (b), combined with 0.001 to 1% by weight of (c) based on the sum of the weights of components (a) and (b).

10. An unsaturated polyester resin as claimed in Claim 9 wherein R in said formula $$\text{R}-\overset{\overset{\text{NO}}{|}}{\text{N}}-\text{OX}$$

is cyclohexyl.

11. An unsaturated polyester resin as claimed in Claim 10 wherein X in said formula $$\text{R}-\overset{\overset{\text{NO}}{|}}{\text{N}}-\text{OX}$$

is aluminum, zinc or cobalt.

12. An unsaturated polyester resin as claimed in Claim 10 wherein X in said formula $$\text{R}-\overset{\overset{\text{NO}}{|}}{\text{N}}-\text{OX}$$

is potassium or calcium.

13. An unsaturated polyester resin as claimed in Claim 9 wherein component (b) is a vinyl aromatic compound.

14. An unsaturated polyester resin as claimed in Claim 13 wherein component (b) is styrene.

References Cited

UNITED STATES PATENTS

| | | | |
|---|---|---|---|
| 2,935,489 | 5/1960 | Bäder et al. | 260—863 X |
| 3,426,063 | 2/1969 | Gros et al. | 260—666.5 |

OTHER REFERENCES

Chemical Abstracts 69, 364912 (1968).

WILLIAM H. SHORT, Primary Examiner

E. A. NIELSEN, Assistant Examiner

U.S. Cl. X.R.

260—864

UNITED STATES PATENT OFFICE
CERTIFICATE OF CORRECTION

PATENT NO. : 3,840,617
DATED : October 8, 1974
INVENTOR(S) : DEMMLER et al

It is certified that error appears in the above-identified patent and that said Letters Patent are hereby corrected as shown below:

In Column 1, after line 7, insert "Claims priority, application Austria, May 28, 1971, A 4648/71"

Signed and Sealed this

Thirteenth Day of July 1976

[SEAL]

Attest:

RUTH C. MASON
Attesting Officer

C. MARSHALL DANN
Commissioner of Patents and Trademarks